US012747028B1

(12) United States Patent
Durocher et al.

(10) Patent No.: US 12,747,028 B1
(45) Date of Patent: Sep. 29, 2026

(54) CLUTCH ASSEMBLY FOR A HYBRID-ELECTRIC AIRCRAFT PROPULSION SYSTEM

(71) Applicant: Pratt & Whitney Canada Corp., Longueuil (CA)

(72) Inventors: Eric S. Durocher, Boucherville (CA); Daniel Ouimette, Terrebonne (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/285,239

(22) Filed: Jul. 30, 2025

(51) Int. Cl.
*B64D 35/022* (2025.01)
*F02C 7/36* (2006.01)
*F16D 13/26* (2006.01)

(52) U.S. Cl.
CPC .............. *B64D 35/022* (2024.01); *F02C 7/36* (2013.01); *F16D 13/26* (2013.01)

(58) Field of Classification Search
CPC . F02C 7/36; F02C 7/32; B64D 27/026; B64D 27/33; B64D 35/022; B64D 35/023; B64D 35/024; B64D 35/025; B64D 27/10; B64D 41/00; B64D 31/18; B64D 27/16; B64D 35/08; F05D 2220/76; F05D 2220/323; F05D 2260/4023; F05D 2220/74; F05D 2220/32; F05D 2220/324; F05D 2220/325; F05D 2220/327; F05D 2240/60; F05D 2260/406; B60Y 2200/92; F01D 15/10; F01D 13/003; F01D 15/12; F01D 25/36; F16D 13/26; F02K 5/00; B64C 11/38
See application file for complete search history.

(56) References Cited

U.S. PATENT DOCUMENTS

| | | | | |
|---|---|---|---|---|
| 4,799,354 | A | 1/1989 | Midgley | |
| 10,717,539 | B2 * | 7/2020 | Menheere | F02C 3/145 |
| 11,535,392 | B2 * | 12/2022 | LaTulipe | B64D 27/33 |
| 2025/0043733 | A1 * | 2/2025 | Spitzer | F01D 15/12 |

FOREIGN PATENT DOCUMENTS

| | | | |
|---|---|---|---|
| WO | 2024161082 | A1 | 8/2024 |

* cited by examiner

*Primary Examiner* — Eric J Zamora Alvarez
(74) *Attorney, Agent, or Firm* — Getz Balich LLC

(57) ABSTRACT

An aircraft propulsion system includes an engine, an electric machine, and a gearbox. The gearbox includes an output shaft, an electric machine drive gear, an engine drive gear, and a clutch assembly. The electric machine drive gear is mounted on the output shaft and driven by the electric machine. The engine drive gear is couplable with the output shaft by the clutch assembly. The clutch assembly includes a housing disk, a plurality of sliding pads, and a coupling piston disk. The housing disk is mounted on the output shaft and forms a plurality of apertures. The sliding pads are arranged circumferentially, each having a pad body portion extending through an aperture and including a first oblique side surface. The coupling piston disk includes a second oblique side surface radially coincident with the first and is movable to compress the sliding pads, coupling the output shaft with the engine drive gear.

20 Claims, 7 Drawing Sheets

CLUTCH ASSEMBLY FOR A HYBRID-ELECTRIC AIRCRAFT PROPULSION SYSTEM

TECHNICAL FIELD

This disclosure relates generally to hybrid-electric propulsion systems for aircraft and, more particularly, to a gearbox clutch assembly for hybrid-electric propulsion systems.

BACKGROUND OF THE ART

Hybrid-electric propulsion systems for aircraft may typically include an electric machine configured to supplement or replace a propulsion system engine (e.g., a gas turbine engine, an intermittent combustion engine, etc.) output to one or more propulsors. Various hybrid-electric propulsion system configurations are known. While these known propulsion system configurations may be suitable for their intended purposes, there is always room in the art for improvement.

SUMMARY

According to an aspect of the present disclosure, an aircraft propulsion system includes an engine, an electric machine, and a gearbox. The gearbox includes an output shaft, an electric machine drive gear, an engine drive gear, and a clutch assembly. The output shaft has a rotational axis. The electric machine drive gear is mounted on the output shaft. The electric machine drive gear is driven by the electric machine. The engine drive gear is selectively couplable with the output shaft by the clutch assembly. The clutch assembly includes a housing disk, a plurality of sliding pads, and a coupling piston disk. The housing disk is mounted on the output shaft. The housing disk forms a plurality of pad apertures extending radially through the housing disk. The plurality of sliding pads are arranged circumferentially about the output shaft. Each of the plurality of sliding pads includes a pad body portion extending through a respective one of the plurality of pad apertures. The pad body portion includes a first oblique side surface. The coupling piston disk includes a second oblique side surface radially coincident with the first oblique side surface. The coupling piston disk is moveably mounted on the housing disk. The coupling piston disk is moveable between a decoupled axial position and a coupled axial position. The coupling piston disk in the coupled axial position has the second oblique side surface contacting the first oblique side surface and radially compressing the plurality of sliding pads to couple the output shaft with the engine drive gear. The output shaft is structured to drive a propulsor.

In any of the aspects or embodiments described above and herein, the gearbox may further include a bearing disposed between the output shaft and the engine drive gear, and the engine drive gear may be rotatable relative to the output shaft on the bearing.

In any of the aspects or embodiments described above and herein, the gearbox may further include a bearing disposed between the electric machine drive gear and the engine drive gear, and the engine drive gear may be rotatable relative to the electric machine drive gear on the bearing.

In any of the aspects or embodiments described above and herein, the engine may include an engine output shaft, the gearbox may include an input shaft and a layshaft assembly, the engine output shaft may be coupled with the input shaft, and the layshaft assembly may couple the input shaft with the engine drive gear.

In any of the aspects or embodiments described above and herein, the clutch assembly may further include a contact ring mounted on the engine drive gear, the pad body portion may include a first side clutching surface, the contact ring may include a second side clutching surface, and the second side clutching surface may contact the first side clutching surface in the coupled axial position of the coupling piston disk.

In any of the aspects or embodiments described above and herein, the clutch assembly may further include an actuator connected to the coupling piston disk, the actuator may be configured to effect axial movement of the coupling piston disk between the decoupled axial position and the coupled axial position.

In any of the aspects or embodiments described above and herein, the plurality of sliding pads may be disposed axially coincident with the engine drive gear.

In any of the aspects or embodiments described above and herein, the engine drive gear may include gear teeth and the plurality of sliding pads may be disposed radially inward of the gear teeth.

In any of the aspects or embodiments described above and herein, the first oblique side surface may be an outer radial surface of the pad body portion, the second oblique side surface may be an inner radial surface of the coupling piston disk, and the contact between the first oblique side surface and the second oblique side surface may move the plurality of sliding pads radially inward as the coupling piston disk moves from the decoupled axial position to the coupled axial position.

In any of the aspects or embodiments described above and herein, the first oblique side surface may be an inner radial surface of the pad body portion, the second oblique side surface may be an outer radial surface of the coupling piston disk, and the contact between the first oblique side surface and the second oblique side surface may move the plurality of sliding pads radially outward as the coupling piston disk moves from the decoupled axial position to the coupled axial position.

According to another aspect of the present disclosure, a method for coupling an engine of an aircraft propulsion system with a propulsor, the propulsor driven by an output shaft, an engine drive gear driven by the engine decoupled from the output shaft by a clutch assembly in a disengaged state, includes driving rotation of the propulsor about a rotational axis with an electric machine coupled with the propulsor by the output shaft and coupling the engine with the propulsor by axially moving a coupling piston disk mounted about the output shaft from a decoupled axial position to a coupled axial position. The coupling piston disk in the coupled axial position contacts a plurality of sliding pads having obliquely oriented pad body surfaces and radially compressing the sliding pads against a clutching surface on the engine drive gear to couple the engine drive gear with the output shaft. The method further includes driving rotation of the propulsor about the rotational axis with the engine.

In any of the aspects or embodiments described above and herein, each of the plurality of sliding pads may include a pad body portion extending through an aperture in a housing disk fixedly mounted on the output shaft.

In any of the aspects or embodiments described above and herein, coupling the engine with the propulsor may include relighting the engine.

In any of the aspects or embodiments described above and herein, the method may further include deenergizing the electric machine subsequent to coupling the engine with the propulsor.

According to another aspect of the present disclosure, an aircraft propulsion system includes an engine, an electric machine, and a gearbox. The gearbox includes an output shaft, an electric machine drive gear, an engine drive gear, and a clutch assembly. The output shaft has a rotational axis. The electric machine drive gear is mounted on the output shaft. The electric machine drive gear is driven by the electric machine. The engine drive gear is selectively couplable with the output shaft by the clutch assembly. The clutch assembly includes a bearing, a coupling piston disk, and a plurality of sliding pads. The bearing is disposed between the output shaft and the engine drive gear. The engine drive gear is rotatable relative to the output shaft on the bearing. The clutch assembly selectively couples the engine drive gear with the output shaft. The clutch assembly is configurable in a disengaged state and an engaged state. The engine and the engine drive gear are decoupled from the output shaft in the disengaged state of the clutch assembly. The engine and the engine drive gear are coupled with the output shaft in the engaged state of the clutch assembly by axial movement of the coupling piston disk to radially compress the plurality of sliding pads against a clutching surface on the engine drive gear. The output shaft is structured to drive a propulsor.

In any of the aspects or embodiments described above and herein, each of the plurality of sliding pads may include a first oblique side surface, the coupling piston disk may include a second oblique side surface radially coincident with the first oblique side surface, the coupling piston disk may be axially moveable between a decoupled axial position and a coupled axial position, and the coupling piston disk in the coupled axial position may have the second oblique side surface contacting the first oblique side surface.

In any of the aspects or embodiments described above and herein, the clutch assembly may include a contact ring fixedly mounted on the engine drive gear, and the contact ring may form the clutching surface.

In any of the aspects or embodiments described above and herein, the clutch assembly may include a housing disk forming a plurality of pad apertures, and each of the plurality of sliding pads may include a pad body portion extending through a respective one of the plurality of pad apertures.

In any of the aspects or embodiments described above and herein, the plurality of sliding pads may be circumferentially arranged about the rotational axis and radially moveable between and inner radial position and an outer radial position.

In any of the aspects or embodiments described above and herein, the gearbox may include an input shaft coupled with the engine by a layshaft assembly, and the layshaft assembly may drive the engine drive gear.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
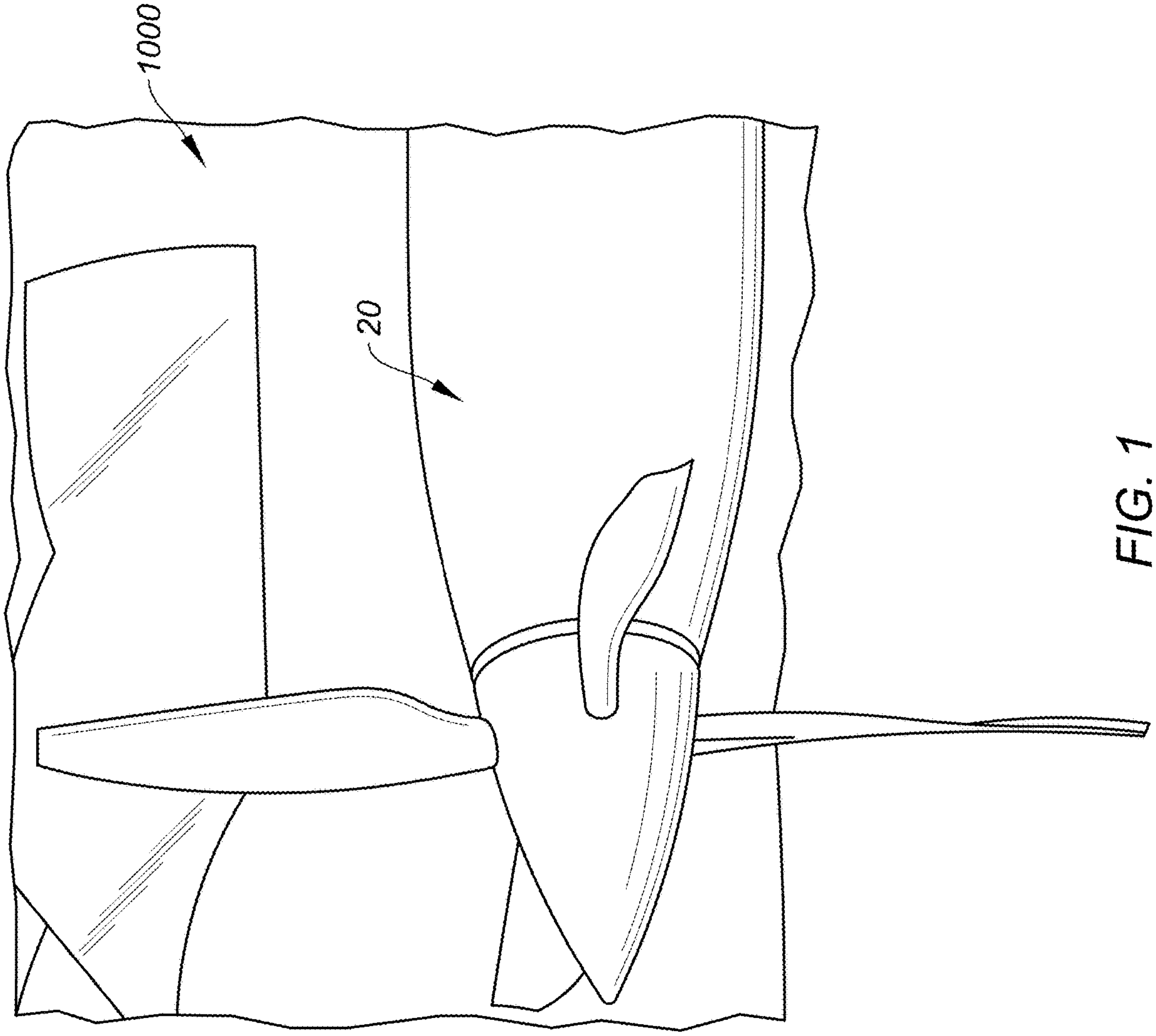
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
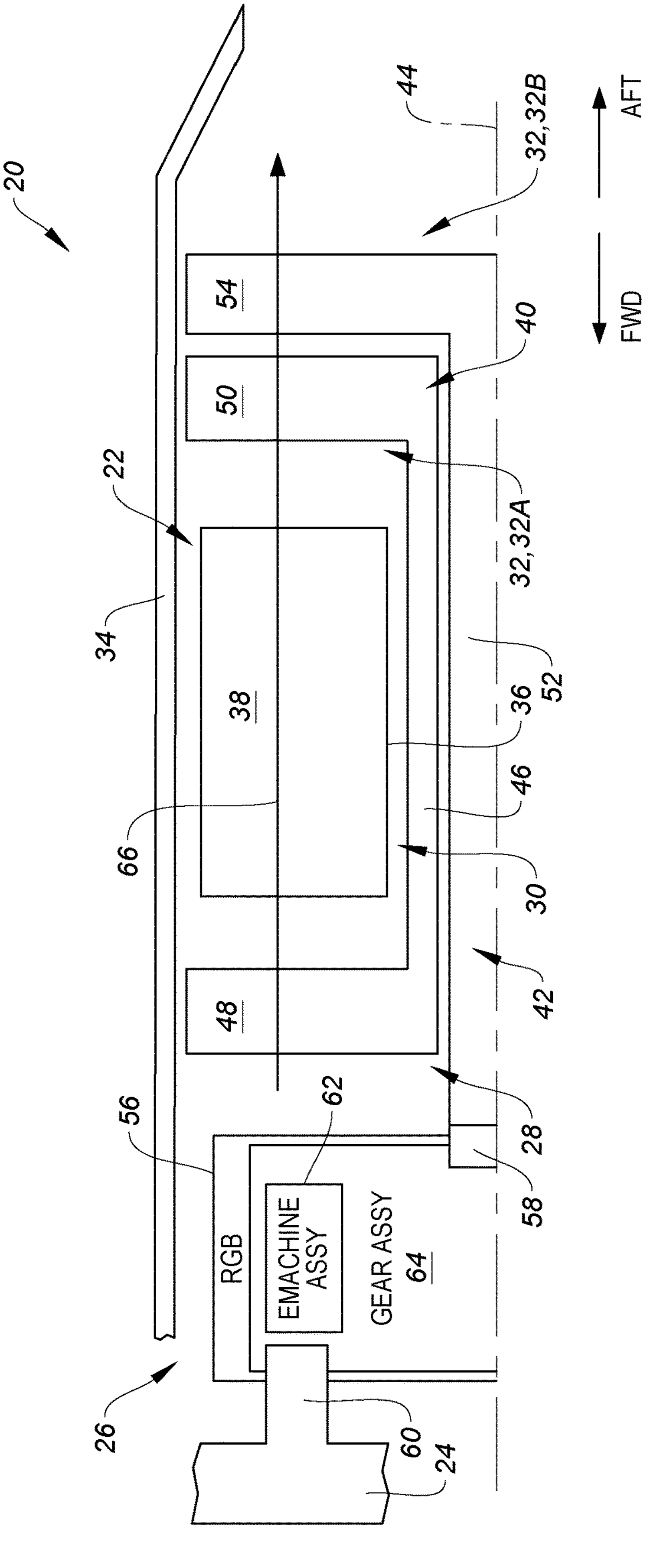
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, a propulsor 24, and a drivetrain 26. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, or other intermittent combustion engines.

The engine 22 of FIG. 2 includes a compressor section 28, a combustor section 30, a turbine section 32, and an engine static structure 34. The combustor section 30 includes a combustor 36 (e.g., an annular combustor) forming a combustion chamber 38. The turbine section 32 includes a high-pressure turbine 32A and a power turbine 32B.

Components of the compressor section 28 and/or the turbine section 32 of FIG. 2 form a first rotational assembly 40 (e.g., a high-pressure spool) and a second rotational assembly 42 of the engine 22. The first rotational assembly 40 and the second rotational assembly 42 are mounted for rotation about a rotational axis 44 (e.g., an axial centerline) of the engine 22 relative to the engine static structure 34.

The first rotational assembly 40 includes a first shaft 46, a bladed compressor rotor 48 for the compressor section 28, and a bladed first turbine rotor 50 for the high-pressure turbine 32A. The first shaft 46 interconnects the bladed compressor rotor 48 and the first turbine rotor 50.

The second rotational assembly 42 of FIG. 2 includes a second shaft 52 (e.g., an engine output shaft) and a bladed power turbine rotor 54 for the power turbine 32B. The second shaft 52 is connected to the power turbine rotor 54. The second shaft 52 is coupled with the propulsor 24 by the drivetrain 26.

The drivetrain 26 includes a gearbox 56 (e.g., a reduction gearbox (RGB)). The gearbox 56 may assume different configurations. The term “gearbox” as used herein may refer to a reduction gearbox that is configured to accept an input rotational drive at a first rotational speed (S1) and at a first torque (T1) and produce an output rotational drive at a second rotational speed (S2) and at a second torque (T2), wherein the first rotational speed is greater than the second rotational speed (S1>S2) and the second torque is greater than the first torque (T2>T1). The drivetrain 26 further includes a gearbox input shaft 58, a gearbox output shaft 60 (e.g., a propulsor output shaft or a propeller shaft), and an electric machine assembly 62.

The gearbox 56 includes and houses a gear assembly 64. The gear assembly 64 couples the gearbox input shaft 58 with the gearbox output shaft 60. For example, the gear assembly 64 may be a reduction gear assembly configured to drive rotation of the gearbox output shaft 60 at a reduced rotational speed relative to the gearbox input shaft 58. The gearbox input shaft 58 is coupled with (e.g., mounted on) the second shaft 52, and interconnects the second shaft 52 with the gear assembly 64. The gearbox output shaft 60 is coupled with (e.g., mounted on) the propulsor 24, and interconnects the propulsor 24 with the gear assembly 64. As will be described in further detail, the electric machine assembly 62 includes one or more electric machines coupled with the gearbox output shaft 60.

The engine static structure 34 includes engine casings, cowlings, and other fixed (e.g., non-rotating) structures of the engine 22 which form, house, and/or support components of the engine 22 such as, but not limited to, those of the compressor section 28, the combustor section 30, and the turbine section 32. The engine static structure 34 may include one or more bearing assemblies configured to rotationally support components of the first rotational assembly 40 and the second rotational assembly 42.

During operation of the propulsion system 20 of FIG. 2, ambient air enters the propulsion system 20 (e.g., through an air intake) and is directed through the engine 22 along a core gas flow path 66. The ambient air flow along the core gas flow path 66 is compressed in the compressor section 28 by rotation of the bladed compressor rotor 48, and directed into the combustor 36 (e.g., the combustion chamber 38). Fuel is injected into the combustion chamber 38 and mixed with the compressed air to provide a fuel-air mixture. This fuel-air mixture is ignited, and combustion products thereof flow through the high-pressure turbine 32A and the power turbine 32B and are exhausted from the propulsion system 20. The first turbine rotor 50 and the power turbine rotor 54 rotationally drive the first rotational assembly 40 and the second rotational assembly 42, respectively, in response to the combustion gas flow through the high-pressure turbine 32A and the power turbine 32B along the core gas flow path 66. The second rotational assembly 42 (e.g., the second shaft 52) drives rotation of the propulsor 24 through the drivetrain 26. The engine 22 and the electric machine(s) of the electric machine assembly 62 may be selectively operated to drive rotation of the propulsor 24 through the gearbox output shaft 60 through the gear assembly 64.

Figure 3:
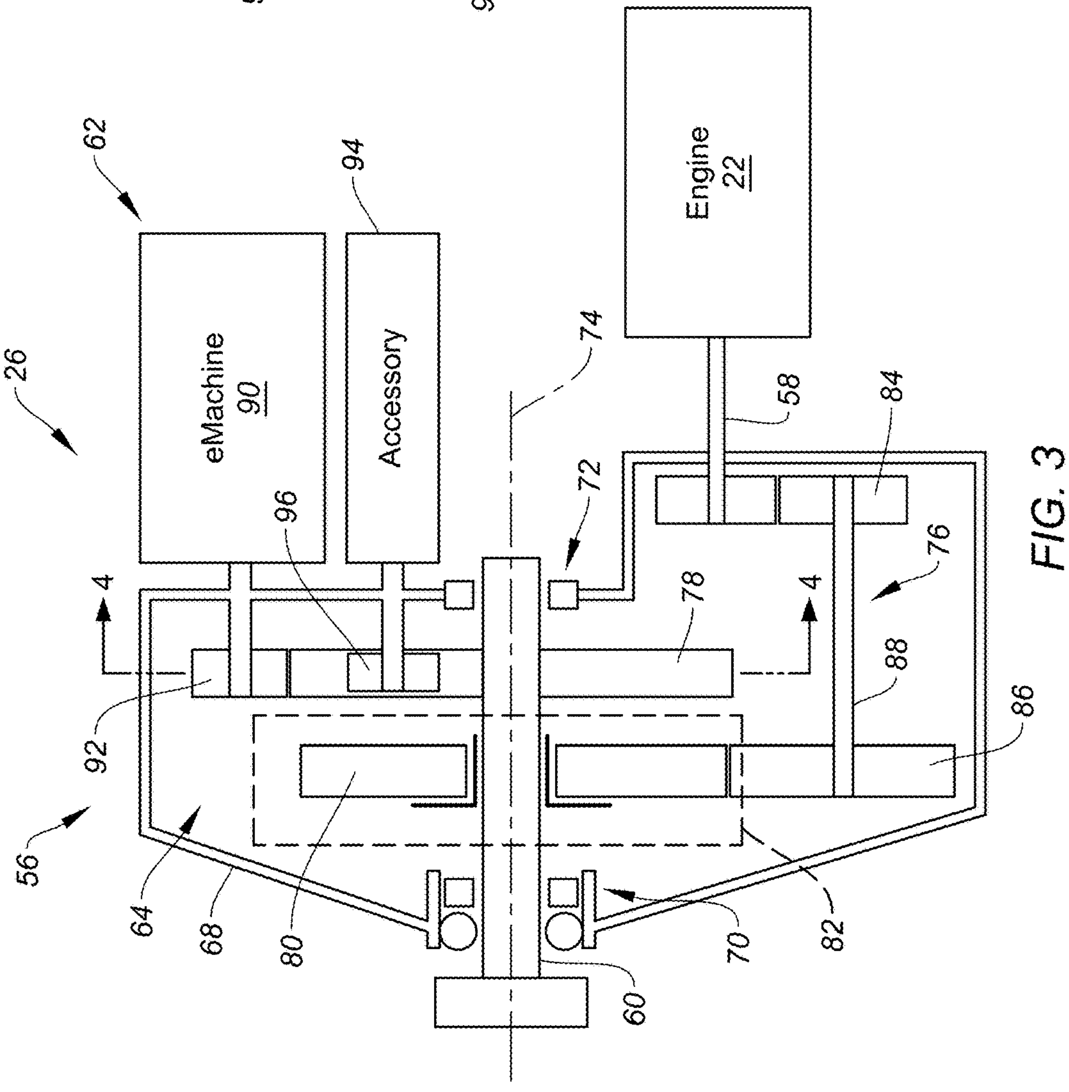
FIG. 3 schematically illustrates a cutaway, side view of a portion of a gearbox, electric machine assembly, and engine of the aircraft propulsion system, in accordance with one or more embodiments of the present disclosure.

FIG. 3 schematically illustrates a cutaway, side view of the gearbox 56 coupled with the engine 22 and the electric machine assembly 62. The gearbox 56 includes a gearbox housing 68, a forward bearing assembly 70, and an aft bearing assembly 72. The gearbox housing 68 houses the gear assembly 64. The gearbox housing 68 structurally supports the forward bearing assembly 70 and the aft bearing assembly 72. The gearbox output shaft 60 is mounted on the forward bearing assembly 70 and the aft bearing assembly 72 for rotation about an output shaft rotational axis 74. The gear assembly 64 of FIG. 3 includes a layshaft assembly 76, an electric machine drive gear 78, an engine drive gear 80, and a clutch assembly 82.

The layshaft assembly 76 includes a layshaft input gear 84, a layshaft output gear 86, and a layshaft 88. The layshaft input gear 84 is engaged (e.g., meshed) with the gearbox input shaft 58. The layshaft output gear 86 is engaged (e.g., meshed) with the engine drive gear 80. The layshaft 88 interconnects the layshaft input gear 84 and the layshaft output gear 86. FIG. 3 illustrates a single layshaft assembly 76 coupling the gearbox input shaft 58 with the engine drive gear 80; however, in some embodiments, the gear assembly 64 may include more than one layshaft assembly 76 (e.g., two layshaft assemblies) coupling the gearbox input shaft 58 with the engine drive gear 80.

The electric machine drive gear 78 is mounted (e.g., fixedly mounted) on the gearbox output shaft 60. The electric machine drive gear 78 extends circumferentially about (e.g., completely around) the gearbox output shaft 60 and the output shaft rotational axis 74. The electric machine drive gear 78 may be disposed axially between the engine drive gear 80 and the aft bearing assembly 72. The electric machine drive gear 78 is coupled with an electric machine 90 (e.g., an electric motor) of the electric machine assembly 62. In particular, the electric machine drive gear 78 is engaged (e.g., meshed) with an electric machine output shaft 92 of the electric machine 90. FIG. 3 illustrates a single electric machine 90 coupled with the electric machine drive gear 78; however, in some embodiments, the electric machine assembly 62 may include more than one electric machine 90 coupled with the electric machine drive gear 78.

The engine drive gear 80 extends circumferentially about (e.g., completely around) the gearbox output shaft 60 and the output shaft rotational axis 74. The engine drive gear 80 may be disposed axially between the electric machine drive gear 78 and the forward bearing assembly 70. The engine drive gear 80 is selectively couplable with the gearbox output shaft 60 by the clutch assembly 82.

Figure 4:
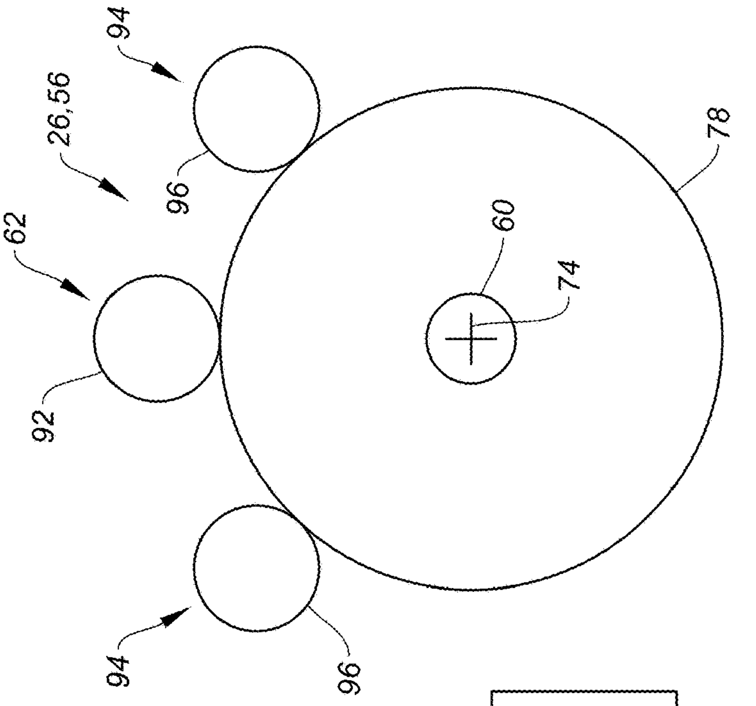
FIG. 4 schematically illustrates a cross-sectional view of the gearbox taken along Line 4-4 of FIG. 3, in accordance with one or more embodiments of the present disclosure.

FIG. 4 schematically illustrates a cross-sectional view of the gear assembly 64 taken along Line 4-4 of FIG. 3. Referring to FIGS. 3 and 4, the gearbox 56 may be coupled to one or more accessory load assemblies 94 of the propulsion system 20 and its engine 22. The gearbox housing 68 may provide support for the accessory load assemblies 94. Each of the accessory load assemblies 94 may be driven by a respective offset gear 96 engaged (e.g., meshed) with the electric machine drive gear 78. Each of the offset gears 96 may be sized (e.g., relative to the electric machine drive gear 78) to facilitate a suitable rotational speed (e.g., speed ratio) for the respective the accessory load assemblies 94. The present disclosure is not limited to any particular number, arrangement, size, or other configuration of the offset gears 96. Examples of the accessory load assemblies 94 may include oil pumps, propeller control units (PCUs), air compressors, electrical generators (e.g., a low-voltage generator), a hydraulic pump, and the like. The configuration of the accessory load assemblies 94 and respective offset gears 96 of FIGS. 3 and 4 facilitate driving the accessory load assemblies 94 with the electric machine(s) 90 during propulsion system 20 operating conditions where the engine 22 may be shutdown. This configuration further facilitates driving the accessory load assemblies 94 with the engine 22 alone or with both the engine 22 and the electric motor(s) 90 during other operating conditions of the propulsion system 20.

Figure 5:
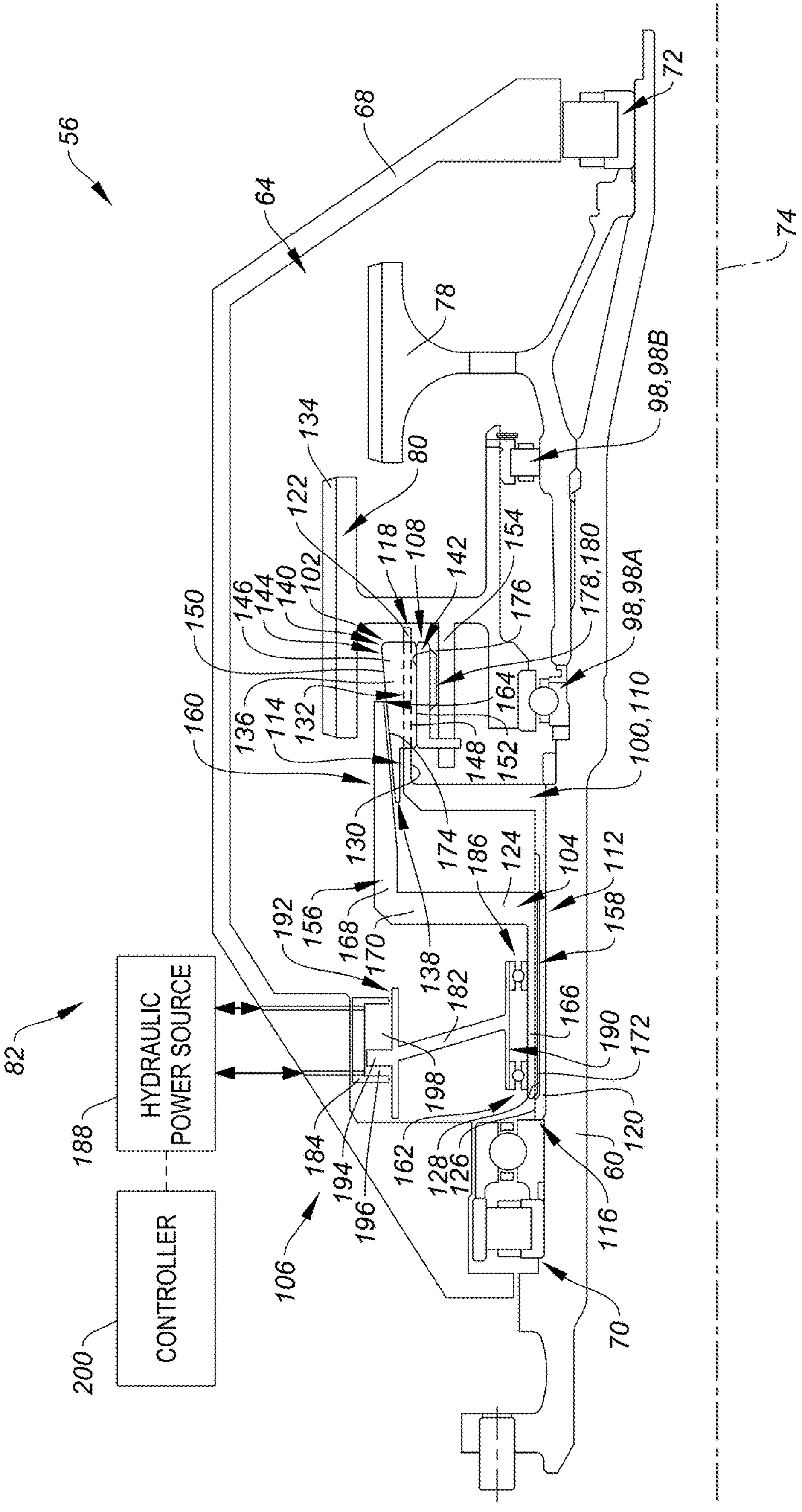
FIG. 5 schematically illustrates a cutaway, side view of the gearbox and a clutch assembly in a disengaged state, in accordance with one or more embodiments of the present disclosure.
Figure 6:
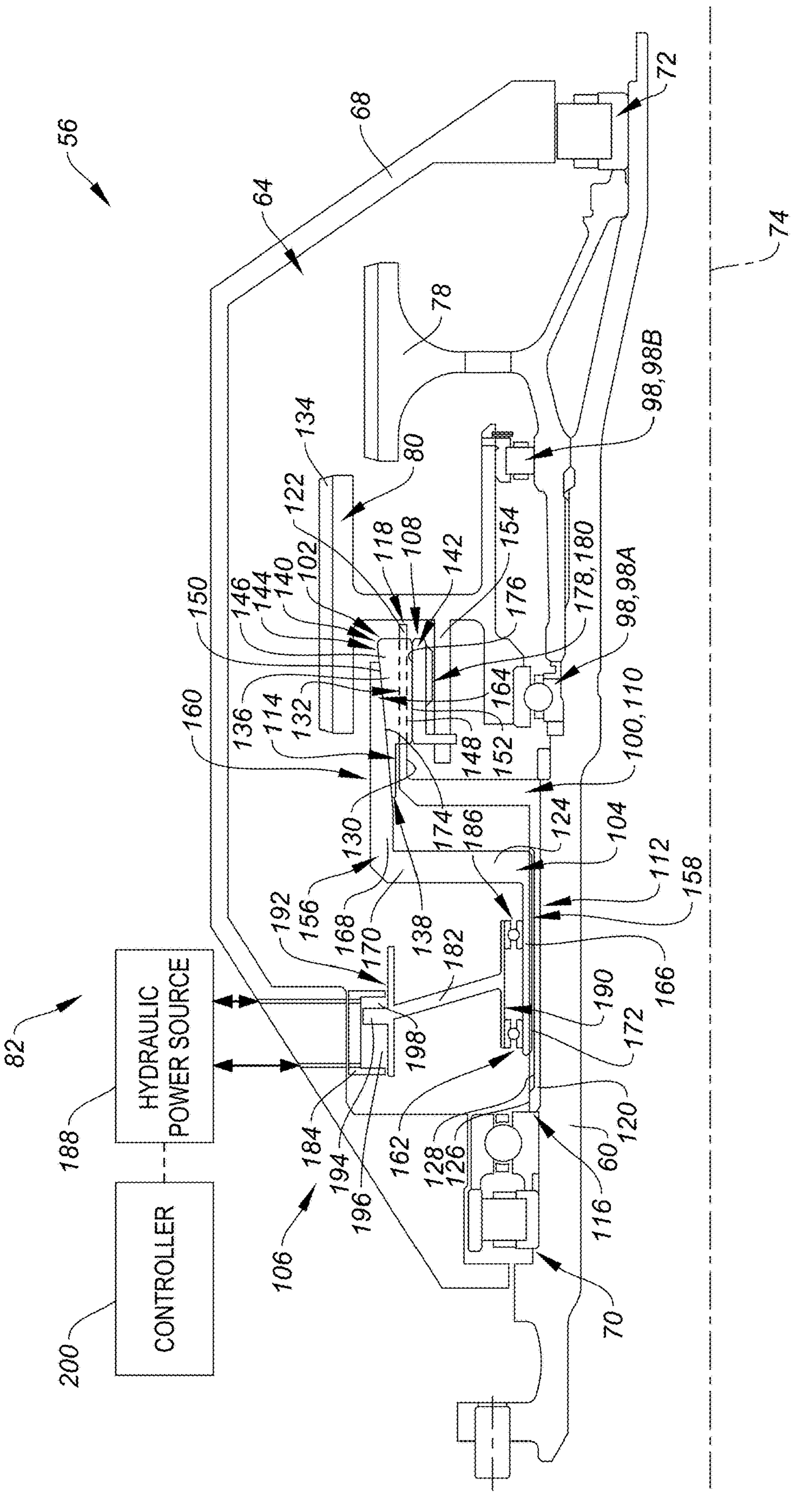
FIG. 6 schematically illustrates a view of a circumferential portion of the clutch assembly of FIG. 5 in an engaged state, in accordance with one or more embodiments of the present disclosure.

Referring to FIGS. 5 and 6, the clutch assembly 82 is shown in greater detail. FIG. 5 shows the clutch assembly 82 in a disengaged state in which the engine drive gear 80 is rotationally decoupled from the gearbox output shaft 60 by the clutch assembly 82. FIG. 6 shows the clutch assembly 82 in an engaged state in which the clutch assembly 82 couples the engine drive gear 80 with the gearbox output shaft 60. The clutch assembly 82 includes one or more engine drive gear bearings 98, a housing disk 100, a plurality of radial sliding pads 102, a coupling piston disk 104, and an actuator assembly 106. The clutch assembly 82 may additionally include a contact ring 108.

The engine drive gear bearings 98 are mounted on the gearbox output shaft 60 and/or the electric machine drive gear 78. For example, the engine drive gear bearings 98 of FIGS. 5 and 6 include a first bearing 98A mounted on the gearbox output shaft 60 and a second bearing 98B mounted on the electric machine drive gear 78. The engine drive gear bearings 98 extend circumferentially about the gearbox output shaft 60 and its output shaft rotational axis 74. The engine drive gear 80 is rotationally mounted on the engine drive gear bearings 98 with the engine drive gear bearings 98 disposed radially between the engine drive gear 80 and the gearbox output shaft 60 and/or the electric machine drive gear 78. The engine drive gear 80 is rotatable on the engine drive gear bearings 98 about the output shaft rotational axis 74 relative to the gearbox output shaft 60 and the electric machine drive gear 78.

The housing disk 100 includes a housing body 110. The housing body 110 extends radially between and to an inner radial end 112 of the housing body 110 and an outer radial end 114 of the housing body 110. The housing body 110 extends axially between and to a first axial end 116 of the housing body 110 and a second axial end 118 of the housing body 110. The housing body 110 includes an inner body portion 120, an outer body portion 122, and a radially-extending body portion 124. The radially-extending body portion 124 extends radially between and connects the inner body portion 120 and the outer body portion 122.

The inner body portion 120 extends axially between and to the first axial end 116 and the radially-extending body portion 124. The inner body portion 120 extends circumferentially about (e.g., completely around) the output shaft 60 and its rotational axis 74. For example, the inner body portion 120 may be configured as a tubular body portion. The inner body portion 120 extends radially between and to the inner radial end 112 and an outer side surface 126 of the inner body portion 120. The inner body portion 120 may form one or more axially-extending slots 128 at the outer side surface 126.

The outer body portion 122 extends axially between and to the second axial end 118 and the radially-extending body portion 124. The outer body portion 122 extends circumferentially about (e.g., completely around) the output shaft 60 and its rotational axis 74. For example, the outer body portion 122 may be configured as a tubular body portion. The outer body portion 122 extends radially between and to the outer radial end 114 and an inner side surface 130 of the outer body portion 122. The outer body portion 122 forms a plurality of pad apertures 132 extending through (e.g., radially through) the outer body portion 122 from the outer radial end 144 to the inner side surface 130. The pad apertures 132 are arranged on the outer body portion 122 as a circumferential array and may be equispaced about the rotational axis 74.

The housing body 110 is fixedly mounted to the output shaft 60. The inner body portion 120 of FIGS. 5 and 6 is mounted on the output shaft 60 at the inner radial end 112, for example, at a splined interface between the output shaft 60 and the inner body portion 120. The second axial end 118 is disposed at the engine drive gear 80. For example, the second axial end 118 and portions of the outer body portion 122 may be disposed axially coincident with the engine drive gear 80. The outer body portion 122 may be disposed radially inward of gear teeth 134 of the engine drive gear 80.

The sliding pads 102 are arranged on the housing disk 100 as a circumferential array about the rotational axis 74. The sliding pads 102 may be disposed axially coincident with the engine drive gear 80. Each of the sliding pads 102 includes an arcuate pad body 136. The pad body 136 extends circumferentially about a portion of the output shaft 60 and its rotational axis 74. The pad body 136 extends axially between and to a first axial end 138 of the pad body 136 and a second axial end 140 of the pad body 136. The pad body 136 extends radially between and to an inner radial end 142 of the pad body 136 and an outer radial end 144 of the pad body 136. The pad body 136 includes an outer body portion 146 and one or more inner body portions 148. The outer body portion 146 extends between and to the first axial end 138 and the second axial end 140. The outer body portion 146 is disposed at the outer radial end 144. The outer body portion 146 forms an outer side surface 150 on the outer radial end 144. The outer side surface 150 has an oblique orientation (e.g., on a plane including the rotational axis 74) which includes both axial and radial components. In particular, the outer side surface 150 of FIGS. 5 and 6 transitions radially outward in an axial direction from the first axial end 138 to the second axial end 140. The outer side surface 150 may extend axially from the first axial end 138 to the second axial end 140. Each of the inner body portions 148 is disposed at the inner radial end 142 and extends radially between and to the outer body portion 146 and the inner radial end 142. Each of the inner body portions 148 forms an inner side clutching surface 152 at the inner radial end 142.

Each of the sliding pads 102 is mounted on the housing disk 100 at the outer body portion 122. The outer body portion 146 is disposed radially outward of the outer body portion 122, for example, disposed on the outer radial end 114. Each of the inner body portions 148 is disposed within and extends radially through a respective one of the pad apertures 132. The inner side clutching surface 152 of each of the inner body portions 148 is disposed radially inward of the outer body portion 122 (e.g., the inner side surface 130). As shown in FIGS. 5 and 6, the inner side clutching surface 152 may be disposed at (e.g., radially abutting) the contact ring 108. Alternatively, in some embodiments, the inner side clutching surface 152 may be disposed at (e.g., radially abutting) a portion of the engine drive gear 80. For example, the inner side clutching surface 152 may be disposed at an axially-extending portion 154 of the engine drive gear 80 disposed radially between the gear teeth 134 and the engine drive gear bearings 98.

The coupling piston disk 104 includes a piston body 156. The piston body 156 extends radially between and to an inner radial end 158 of the piston body 156 and an outer radial end 160 of the piston body 156. The piston body 156 extends axially between and to a first axial end 162 of the piston body 156 and a second axial end 164 of the piston body 156. The piston body 156 includes an inner body portion 166, an outer body portion 168, and a radially-extending body portion 170. The radially-extending body portion 170 extends radially between and connects the inner body portion 166 and the outer body portion 168.

The inner body portion 166 extends axially between and to the first axial end 162 and the radially-extending body portion 170. The inner body portion 166 extends circumferentially about (e.g., completely around) the output shaft 60 and its rotational axis 74. For example, the inner body portion 166 may be configured as a tubular body portion. The inner body portion 170 may include one or more axially-extending rails 172 at the inner radial end 158. The rails 172 may be configured for engagement with the slots 128 to facilitate axial movement of the coupling piston disk 104 on the housing disk 100 while rotationally fixing the coupling piston disk 104 relative to the housing disk 100. The present disclosure, however, is not limited to the foregoing exemplary engagement configuration of the coupling piston disk 104 and the housing disk 100.

The outer body portion 168 extends axially between and to the second axial end 164 and the radially-extending body portion 170. The outer body portion 168 extends circumferentially about (e.g., completely around) the output shaft 60 and its rotational axis 74. For example, the outer body portion 168 may be configured as a tubular body portion. The outer body portion 168 extends radially between and to the outer radial end 160 and an inner side surface 174 of the outer body portion 168. The inner side surface 174 extends circumferentially about (e.g., completely around) the output shaft 60 and its rotational axis 74. The inner side surface 174 is disposed radially coincident with the outer side surface 126. The inner side surface 174 has an oblique orientation (e.g., on a plane including the rotational axis 74) which includes both axial and radial components. In particular, the inner side surface 174 of FIGS. 5 and 6 transitions radially outward in an axial direction from the radially-extending body segment 170 to the second axial end 164. The inner side surface 174 may be oriented along the plane at an oblique angle (e.g., relative to the rotational axis 74) which is the same as or substantially the same as (e.g., within 10 degrees) of a corresponding oblique angle of the outer side surface 126.

The coupling piston disk 104 is moveably mounted on the housing disk 100. For example, the rails 172 of the coupling piston disk 104 may be engaged with the slots 128 of the housing disk 100, as described above. The coupling piston disk 104 is axially moveable between a decoupled axial position and a coupled axial position. FIG. 5 shows the coupling piston disk 104 in its decoupled axial position and the clutch assembly 82 in its disengaged state. FIG. 6 shows the coupling piston disk 104 in its coupled axial position and the clutch assembly 82 in its engaged state. As shown in FIGS. 5 and 6, the decoupled axial position may be understood as a forward axial position of the coupling piston disk 104 and the coupled axial position may be understood as an aft axial position of the coupling piston disk 104; however, the present disclosure is not limited to the particular orientation of the clutch assembly 82 of FIGS. 5 and 6. In the decoupled axial position, the coupling piston disk 104 (e.g., the inner side surface 174) may be decoupled (e.g., separated) from the sliding pads 102 (e.g., the outer side surface 150). In the coupled axial position, the coupling piston disk 104 (e.g., the inner side surface 174) is coupled with (e.g., contacts) the sliding pads 102 (e.g., the outer side surface 150).

In some embodiments, the clutch assembly 82 includes the contact ring 108 mounted on the engine drive gear 80. The contact ring 108 of FIGS. 5 and 6 includes an outer side clutching surface 176 facing radially outward. The outer side clutching surface 176 is disposed at (e.g., on, adjacent, or proximate) the inner side clutching surface 152. The outer side clutching surface 176 is configured to contact and rub against the inner side clutching surface 152 to facilitate coupling between the output shaft 60 and the engine drive gear 80. The contact ring 108 may serve as a sacrificial part which may be replaced as it becomes worn through contact with the sliding pads 102, thereby obviating a need for direct contact between the sliding pads 102 and engine drive gear 80 and avoiding engine drive gear 80 wear from said direct contact. The contact ring 108 is fixedly mounted on the engine drive gear 80. For example, the contact ring 108 of FIGS. 5 and 6 is mounted on an outer radial side of the axially-extending portion 154. The contact ring 108 of FIGS. 5 and 6 is coupled with the axially-extending portion 154 at a splined interface formed by a plurality of splines 178 of the contact ring 108 and a counterpart plurality of splines 180 of the axially-extending portion 154.

The actuator assembly 106 is configured to effect positioning of the coupling piston disk 104 in and axially between its decoupled and coupled axial positions. The actuator assembly 106 includes a piston 182, a hydraulic chamber housing 184, one or more bearings 186, and a hydraulic power source 188. The piston 182 extends circumferentially about (e.g., completely around) the gearbox output shaft 60 and its rotational axis 74. The piston 182 extends radially between and to an inner radial end 190 of the piston 182 and an outer radial end 192 of the piston 182. The piston 182 includes a piston seal member 194 disposed at the outer radial end 192. The piston seal member 194 is disposed within the hydraulic chamber housing 184. The piston seal member 194 is disposed between and separates a first hydraulic chamber 196 and a second hydraulic chamber 198. The hydraulic chamber housing 184 of FIGS. 5 and 6 is mounted on the gearbox housing 68. The hydraulic chamber housing 184 further forms the first hydraulic chamber 196 and the second hydraulic chamber 198. The bearings 186 coupling the piston 182 and the coupling piston disk 104. For example, the bearings 186 are coupled with and radially between the inner body portion 166 and the inner radial end 190. The coupling piston disk 104, coupled with the piston 182 by the bearings 186, is axially fixed relative to the piston 182 and rotatable about the rotational axis 74 relative to the piston 182. The hydraulic power source 188 is connected in fluid communication with the first hydraulic chamber 196 and the second hydraulic chamber 198. The hydraulic power source 188 is configured to selectively direct a pressurized hydraulic fluid to the first hydraulic chamber 196 or the second hydraulic chamber 198 to effect axial movement of the piston 182 and, in turn, the coupling piston disk 104. While the actuator assembly 106 of FIGS. 5 and 6 is configured as a hydraulic linear actuator, the actuator assembly 106 may alternatively be configured as a pneumatic actuator, an electro-mechanical actuator, or another suitable actuator for effecting axial movement of the coupling piston disk 104.

During some flight modes, it may be desirable to drive rotation of the propulsor 24 with only the electric machine assembly 62 (e.g., the electric machine(s) 90). The electric machine(s) 90 may drive rotation of the gearbox output shaft 60 through the electric machine drive gear 78 while the clutch assembly 82, in its disengaged state with the coupling piston disk 104 in its decoupled axial position, rotationally decouples the engine 22 from the gearbox output shaft 60. In these electric-only flight modes, the engine 22 may be shut down, idled, or otherwise operated mechanically independent of the gearbox output shaft 60 with the engine output shaft 60 rotating (e.g., freely) relative to the engine drive gear 80 as facilitated by the engine drive gear bearings 98.

During some other flight modes, it may be desirable to drive rotation of the propulsor 24 with only the engine 22 or with a combination of the engine 22 and the electric machine assembly 62. The engine 22 may drive rotation of the gearbox output shaft 60 through the engine drive gear 80 and the clutch assembly 82 once the clutch assembly 82 is configured in its engaged state. The engine 22 may initially be in a shut down or idle operating condition. A pilot or other operator of the aircraft 1000 (see FIG. 1) may relight (e.g., initiate fuel flow and combustion in the engine 22) and/or control the engine 22 to increase a rotation speed of the gearbox input shaft 58 driven by the engine 22 (e.g., the second rotational assembly 42). In the disengaged state of the clutch assembly 82, as shown in FIG. 5, the outer side surface 150 of each of the sliding pads 102 may be decoupled (e.g., separated) from the inner side surface 174. The sliding pads 102 rotate with the housing disk 100 with the inner side clutching surface 152 of each of the inner body portions 148 disposed at (e.g., on, adjacent, or proximate) the outer side clutching surface 176 of the contact ring 108. With the coupling piston disk 104 decoupled from the sliding pads 102, the sliding pads 102 have a radially floating condition whereby the sliding pads 102 are radially moveable relative to the contact ring 108 such that the sliding pads 102 rotate with the output shaft 60 and the housing disk 100 while effecting no or substantially no torque transfer between the output shaft 60 and the engine drive gear 80. In the engaged state of the clutch assembly 82, as shown in FIG. 6, the inner side surface 174 of the coupling piston disk 104 contacts the outer side surface 150 of each of the sliding pads 102, and the oblique orientation of the inner side surface 174 and the outer side surface 150 causes the coupling piston disk 104 to radially compress (e.g., squeeze) the sliding pads 102 inward against the contact ring 108 at the interface of the inner side clutching surface 152 and the outer side clutching surface 176, thereby coupling the engine 22 with the output shaft 60 by facilitating torque transfer between the engine drive gear 80 and the output shaft 60. Once the engine 22 is coupled with the gearbox output shaft 60, some or all of the electric machine (s) 90 may optionally be deenergized.

In some embodiments, the present disclosure clutch assembly 82 may include a controller 200 or be implemented using a controller 200 (e.g., a "shared controller") dedicated to perform other functionality as well as the functionality described herein. A non-limiting example of a "shared controller" is the electronic engine control (EEC). Regardless of whether a dedicated controller or a "shared controller" is utilized, the controller 200 is in communication with other clutch assembly 82 components such as the hydraulic power source 188 to control the operation of the respective clutch assembly 82 components and/or to receive signals from and/or transmit signals to those clutch assembly 82 components to perform the functions described herein. The controller 200 may include one or more of any type of computing device, computational circuit, processor(s), CPU, computer, or the like (collectively referred to as a "control device") capable of executing a series of instructions that are stored in memory. In those embodiments wherein the controller 200 includes more than one control device, the control devices may be in communication with one another and may be disposed in any architecture that is capable of achieving the functionality described herein. The instructions may include an operating system, and/or executable software modules such as program files, system data, buffers, drivers, utilities, and the like. The executable instructions may apply to any functionality described herein to enable the clutch assembly 82 to accomplish the same algorithmically and/or coordination of clutch assembly 82 components. The controller 200 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 200 may include, or may be in communication with, an input device (not shown) that enables a user to enter data and/or instructions, and may include, or be in communication with, an output device configured, for example to display information (e.g., a visual display, or the like), or to transfer data, etc. Communications between the controller 200 and other system components may be via a hardwire connection or via a wireless connection.

Figure 7:
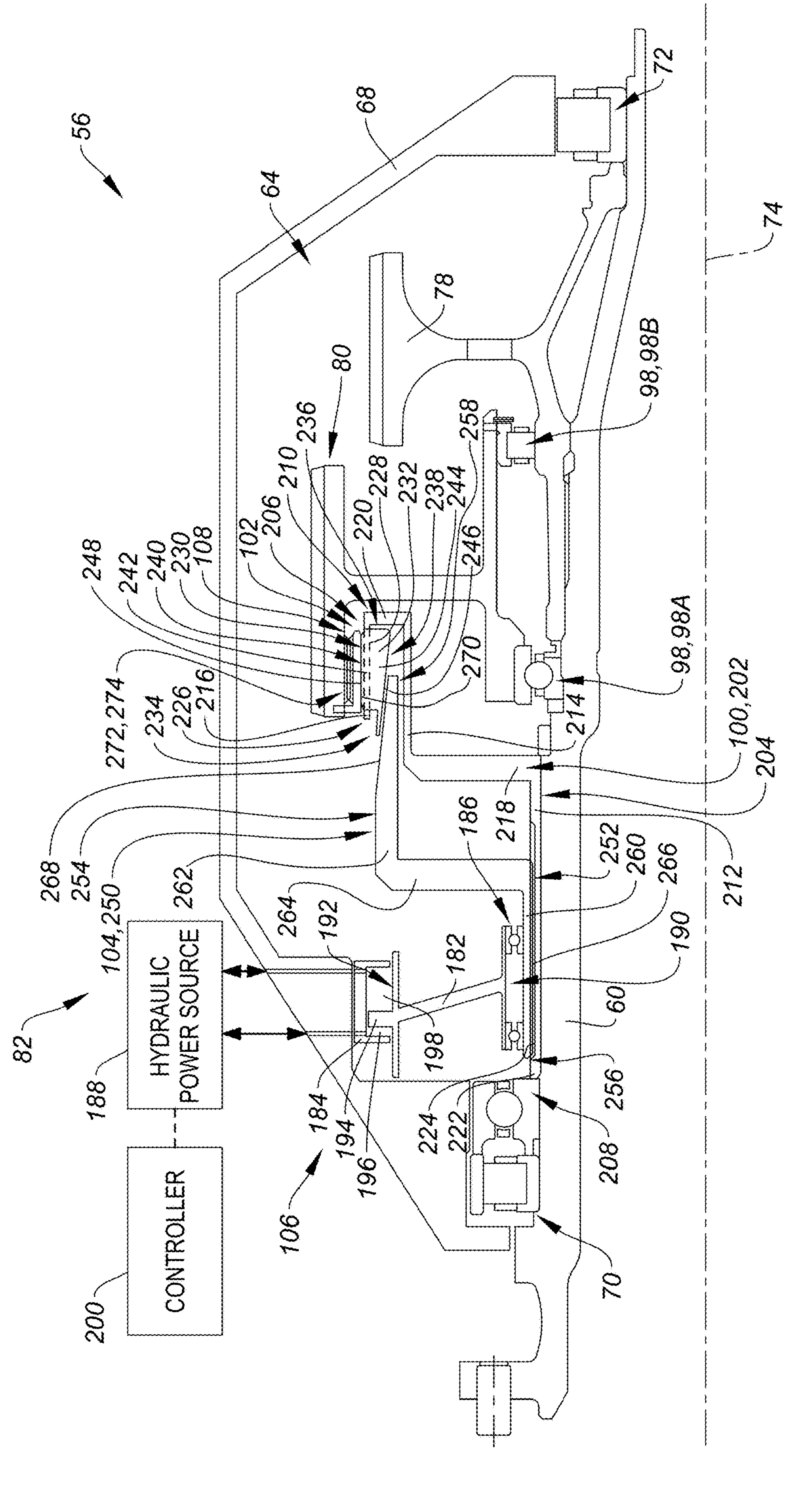
FIG. 7 schematically illustrates a cutaway, side view of the gearbox and another clutch assembly in a disengaged state, in accordance with one or more embodiments of the present disclosure.
Figure 8:
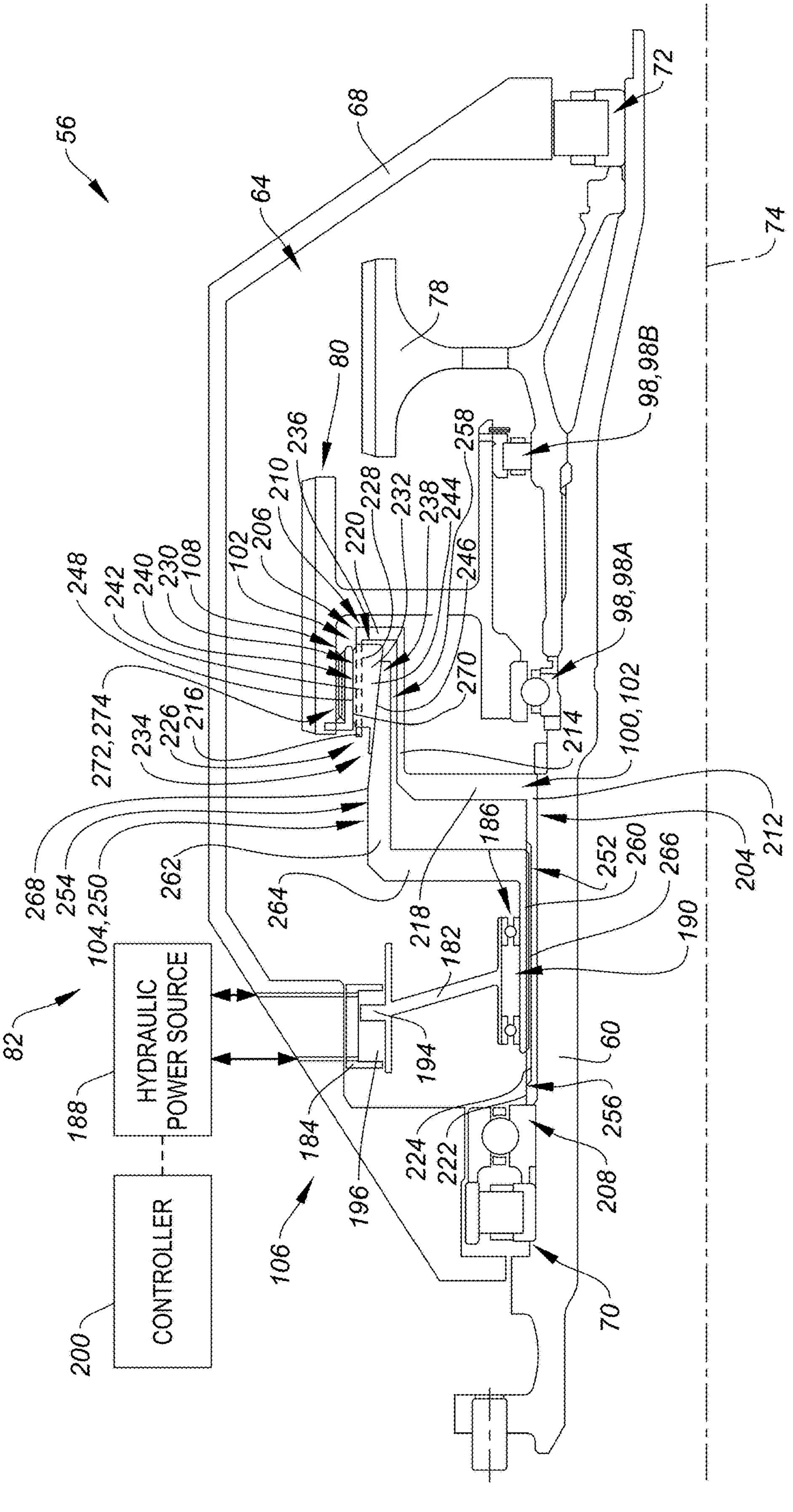
FIG. 8 schematically illustrates a view of a circumferential portion of the clutch assembly of FIG. 7 in an engaged state, in accordance with one or more embodiments of the present disclosure.

Referring to FIGS. 7 and 8, another embodiment of the clutch assembly 82 is shown. FIG. 7 shows the clutch assembly 82 in a disengaged state in which the engine drive gear 80 is rotationally decoupled from the gearbox output shaft 60 by the clutch assembly 82. FIG. 8 shows the clutch assembly 82 in an engaged state in which the clutch assembly 82 couples the engine drive gear 80 with the gearbox output shaft 60. Like the clutch assembly 82 of FIGS. 5 and 6, the clutch assembly 82 of FIGS. 7 and 8 includes the housing disk 100, the plurality of radial sliding pads 102, and the coupling piston disk 104, and may additionally include the contact ring 108.

The housing disk 100 of FIGS. 7 and 8 includes a housing body 202. The housing body 202 extends radially between and to an inner radial end 204 of the housing body 202 and an outer radial end 206 of the housing body 202. The housing body 202 extends axially between and to a first axial end 208 of the housing body 202 and a second axial end 210 of the housing body 202. The housing body 202 includes an inner body portion 212, an intermediate body portion 214, an outer body portion 216, a first radially-extending body portion 218, and a second radially-extending body portion 220. The first radially-extending body portion 218 extends radially between and connects the inner body portion 212 and the intermediate body portion 214. The second radially-extending body portion 220 is disposed at the second axial end 210. The second radially-extending body portion 220 extends radially between and connects the intermediate body portion 214 and the outer body portion 216.

The inner body portion 212 extends axially between and to the first axial end 208 and the first radially-extending body portion 218. The inner body portion 212 extends circumferentially about (e.g., completely around) the output shaft 60 and its rotational axis 74. For example, the inner body portion 212 may be configured as a tubular body portion. The inner body portion 212 extends radially between and to the inner radial end 204 and an outer side surface 222 of the inner body portion 212. The inner body portion 212 may form one or more axially-extending slots 224 at the outer side surface 222.

The intermediate body portion 214 is disposed radially between the inner body portion 212 and the outer body portion 216. The intermediate body portion 214 extends axially between and to the first radially-extending body portion 218 and the second radially-extending body portion 220. The intermediate body portion 214 extends circumferentially about (e.g., completely around) the output shaft 60 and its rotational axis 74. For example, the intermediate body portion 214 may be configured as a tubular body portion.

The outer body portion 216 extends axially between and to the second radially-extending body portion 220 and a distal axial end 226 of the outer body portion 216 axially between the first axial end 208 and the second axial end 210. The outer body portion 216 extends circumferentially about (e.g., completely around) the output shaft 60 and its rotational axis 74. For example, the outer body portion 216 may be configured as a tubular body portion. The outer body portion 216 extends radially between and to the outer radial end 206 and an inner side surface 228 of the outer body portion 216. The outer body portion 216 forms a plurality of pad apertures 230 extending through (e.g., radially through) the outer body portion 216 from the outer radial end 206 to the inner side surface 228. The pad apertures 230 are arranged on the outer body portion 216 as a circumferential array and may be equispaced about the rotational axis 74.

The housing body 202 is fixedly mounted to the output shaft 60. The inner body portion 212 of FIGS. 7 and 8 is mounted on the output shaft 60 at the inner radial end 204, for example, at a splined interface between the output shaft 60 and the inner body portion 212. The second axial end 210 is disposed at the engine drive gear 80. For example, the second axial end 210, the second radially-extending body portion 220, and portions of the outer body portion 216 may be disposed axially coincident with the engine drive gear 80. The outer body portion 216 may be disposed radially inward of the gear teeth 134 of the engine drive gear 80.

The sliding pads 102 of FIGS. 7 and 8 are arranged on the housing disk 100 as a circumferential array about the rotational axis 74. The sliding pads 102 may be disposed axially coincident with the engine drive gear 80. Each of the sliding pads 102 of FIGS. 7 and 8 includes an arcuate pad body 232. The pad body 232 extends circumferentially about a portion of the output shaft 60 and its rotational axis 74. The pad body 232 extends axially between and to a first axial end 234 of the pad body 232 and a second axial end 236 of the pad body 232. The pad body 232 extends radially between and to an inner radial end 238 of the pad body 232 and an outer radial end 240 of the pad body 232. The pad body 232 includes an inner body portion 242 and one or more outer body portions 244. The inner body portion 242 extends between and to the first axial end 234 and the second axial end 236. The inner body portion 242 forms an inner side surface 246 on the inner radial end 238. The inner side surface 246 has an oblique orientation (e.g., on a plane including the rotational axis 74) which includes both axial and radial components. In particular, the inner side surface 246 of FIGS. 7 and 8 transitions radially inward in an axial direction from the first axial end 234 to the second axial end 236. The inner side surface 246 may extend axially from the first axial end 234 to the second axial end 236. Each of the outer body portions 244 is disposed at the outer radial end 240 and extends radially between and to the inner body portion 242 and the outer radial end 240. Each of the outer body portions 244 forms an outer side clutching surface 248 at the outer radial end 240.

Each of the sliding pads 102 of FIGS. 7 and 8 is mounted on the housing disk 100 at the outer body portion 216. The inner body portion 242 is disposed at the outer body portion 216 (e.g., the inner side surface 228) and, for example, radially between the outer body portion 216 and the intermediate body portion 214. Each of the outer body portions 244 is disposed within and extends radially through a respective one of the pad apertures 230. The outer side clutching surface 248 of each of the outer body portions 244 is disposed radially outward of the outer body portion 216 (e.g., the outer radial end 206). As shown in FIGS. 7 and 8, the outer side clutching surface 248 may be disposed at (e.g., radially abutting) the contact ring 108. Alternatively, in some embodiments, the outer side clutching surface 248 may be disposed at (e.g., radially abutting) a portion of the engine drive gear 80. For example, the outer side clutching surface 248 may be disposed at a portion of the engine drive gear 80 disposed radially inward of the gear teeth 134.

The coupling piston disk 104 of FIGS. 7 and 8 includes a piston body 250. The piston body 250 extends radially between and to an inner radial end 252 of the piston body 250 and an outer radial end 254 of the piston body 250. The piston body 250 extends axially between and to a first axial end 256 of the piston body 250 and a second axial end 258 of the piston body 250. The piston body 250 includes an inner body portion 260, an outer body portion 262, and a radially-extending body portion 264. The radially-extending body portion 264 extends radially between and connects the inner body portion 260 and the outer body portion 262.

The inner body portion 260 extends axially between and to the first axial end 256 and the radially-extending body portion 264. The inner body portion 260 extends circumferentially about (e.g., completely around) the output shaft 60 and its rotational axis 74. For example, the inner body portion 260 may be configured as a tubular body portion. The inner body portion 260 may include one or more axially-extending rails 266 at the inner radial end 252. The rails 266 may be configured for engagement with the slots 224 to facilitate axial movement of the coupling piston disk 104 on the housing disk 100 while rotationally fixing the coupling piston disk 104 relative to the housing disk 100. The present disclosure, however, is not limited to the foregoing exemplary engagement configuration of the coupling piston disk 104 and the housing disk 100.

The outer body portion 262 extends axially between and to the second axial end 258 and the radially-extending body portion 264. The outer body portion 262 extends circumferentially about (e.g., completely around) the output shaft 60 and its rotational axis 74. For example, the outer body portion 262 may be configured as a tubular body portion. The outer body portion 262 forms an outer side surface 268 at the outer radial end 254. The outer side surface 268 extends circumferentially about (e.g., completely around) the output shaft 60 and its rotational axis 74. The outer side surface 268 is disposed radially coincident with the inner side surface 246. The outer side surface 268 has an oblique orientation (e.g., on a plane including the rotational axis 74) which includes both axial and radial components. In particular, the outer side surface 268 of FIGS. 7 and 8 transitions radially inward in an axial direction from the radially-extending body segment 264 to the second axial end 258. The outer side surface 268 may be oriented along the plane at an oblique angle (e.g., relative to the rotational axis 74) which is the same as or substantially the same as (e.g., within 10 degrees) of a corresponding oblique angle of the inner side surface 246.

The coupling piston disk 104 of FIGS. 7 and 8 is moveably mounted on the housing disk 100. For example, the rails 266 of the coupling piston disk 104 may be engaged with the slots 224 of the housing disk 100, as described above. The coupling piston disk 104 is axially moveable between a decoupled axial position and a coupled axial position. FIG. 7 shows the coupling piston disk 104 in its decoupled axial position and the clutch assembly 82 in its disengaged state. FIG. 8 shows the coupling piston disk 104 in its coupled axial position and the clutch assembly 82 in its engaged state. As shown in FIGS. 7 and 8, the decoupled axial position may be understood as a forward axial position of the coupling piston disk 104 and the coupled axial position may be understood as an aft axial position of the coupling piston disk 104; however, the present disclosure is not limited to the particular orientation of the clutch assembly 82 of FIGS. 7 and 8. In the decoupled axial position, the coupling piston disk 104 (e.g., the outer side surface 268) may contact the sliding pads 102 (e.g., the inner side surface 246) with the sliding pads 102 in an inner radial position. In the coupled axial position, the coupling piston disk 104 (e.g., the outer side surface 268) may contact the sliding pads 102 (e.g., the inner side surface 246) with the sliding pads 102 in an outer radial position.

In some embodiments, the clutch assembly 82 of FIGS. 7 and 8 includes the contact ring 108 mounted on the engine drive gear 80. The contact ring 108 of FIGS. 7 and 8 includes an inner side clutching surface 270 facing radially inward. The inner side clutching surface 270 is disposed at (e.g., on, adjacent, or proximate) the outer side clutching surface 248. The inner side clutching surface 270 is configured to contact and rub against the outer side clutching surface 248 to facilitate coupling between the output shaft 60 and the engine drive gear 80. The contact ring 108 is fixedly mounted on the engine drive gear 80. For example, the contact ring 108 of FIGS. 7 and 8 is mounted on a portion of the engine drive gear 80 radially inward of the gear teeth 134. The contact ring 108 of FIGS. 7 and 8 is coupled with the engine drive gear 80 at a splined interface formed by a plurality of splines 272 of the contact ring 108 and a counterpart plurality of splines 274 of the engine drive gear 80.

In the disengaged state of the clutch assembly 82, as shown in FIG. 7, with the coupling piston disk 104 in its decoupled axial position, the sliding pads 102 in their inner radial positions rotate with the output shaft 60 and the housing disk 100 while effecting no or substantially no torque transfer between the output shaft 60 and the engine drive gear 80 (e.g., the contact ring 108). In their inner radial positions, the sliding pads 102 (e.g., the outer side clutching surface 248 may be spaced (e.g., radially spaced) from or contacting (e.g., lightly abutting) the inner side clutching surface 270 of the contact ring 108. With the coupling piston disk 104 in its decoupled axial position, the sliding pads 102 have a radially floating condition whereby the sliding pads 102 are radially moveable relative to the contact ring 108 such that the sliding pads 102 rotate with the output shaft 60 and the housing disk 100. In the engaged state of the clutch assembly 82, as shown in FIG. 8, the outer side surface 268 of the coupling piston disk 104 contacts the inner side surface 246 of each of the sliding pads 102, and the oblique orientation of the outer side surface 268 and the inner side surface 246 causes the coupling piston disk 104 to radially compress (e.g., squeeze) the sliding pads 102 outward against the contact ring 108 at the interface of the outer side clutching surface 248 and the inner side clutching surface 270, thereby coupling the engine 22 with the output shaft 60 by facilitating torque transfer between the engine drive gear 80 and the output shaft 60.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:

an engine;

an electric machine; and a gearbox including an output shaft, an electric machine drive gear, an engine drive gear, and a clutch assembly, the output shaft having a rotational axis, the electric machine drive gear mounted on the output shaft, the electric machine drive gear driven by the electric machine, the engine drive gear selectively couplable with the output shaft by the clutch assembly, the clutch assembly including a housing disk, a plurality of sliding pads, and a coupling piston disk, the housing disk mounted on the output shaft, the housing disk forming a plurality of pad apertures extending radially through the housing disk, the plurality of sliding pads arranged circumferentially about the output shaft, each of the plurality of sliding pads including a pad body portion extending through a respective one of the plurality of pad apertures, the pad body portion including a first oblique side surface, the coupling piston disk including a second oblique side surface radially coincident with the first oblique side surface, the coupling piston disk moveably mounted on the housing disk, the coupling piston disk moveable between a decoupled axial position and a coupled axial position, the coupling piston disk in the coupled axial position having the second oblique side surface contacting the first oblique side surface and radially compressing the plurality of sliding pads to couple the output shaft with the engine drive gear, and the output shaft structured to drive a propulsor.

2. The aircraft propulsion system of claim 1, wherein the gearbox further includes a bearing disposed between the output shaft and the engine drive gear, and the engine drive gear is rotatable relative to the output shaft on the bearing.

3. The aircraft propulsion system of claim 1, wherein the gearbox further includes a bearing disposed between the electric machine drive gear and the engine drive gear, and the engine drive gear is rotatable relative to the electric machine drive gear on the bearing.

4. The aircraft propulsion system of claim 1, wherein the engine includes an engine output shaft, the gearbox includes an input shaft and a layshaft assembly, the engine output shaft is coupled with the input shaft, and the layshaft assembly couples the input shaft with the engine drive gear.

5. The aircraft propulsion system of claim 1, wherein the clutch assembly further includes a contact ring mounted on the engine drive gear, the pad body portion includes a first side clutching surface, the contact ring includes a second side clutching surface, and the second side clutching surface contacts the first side clutching surface in the coupled axial position of the coupling piston disk.

6. The aircraft propulsion system of claim 1, wherein the clutch assembly further includes an actuator connected to the coupling piston disk, the actuator configured to effect axial movement of the coupling piston disk between the decoupled axial position and the coupled axial position.

7. The aircraft propulsion system of claim 1, wherein the plurality of sliding pads are disposed axially coincident with the engine drive gear.

8. The aircraft propulsion system of claim 7, wherein the engine drive gear includes gear teeth and the plurality of sliding pads are disposed radially inward of the gear teeth.

9. The aircraft propulsion system of claim 1, wherein the first oblique side surface is an outer radial surface of the pad body portion, the second oblique side surface is an inner radial surface of the coupling piston disk, and the contact between the first oblique side surface and the second oblique side surface moves the plurality of sliding pads radially inward as the coupling piston disk moves from the decoupled axial position to the coupled axial position.

10. The aircraft propulsion system of claim 1, wherein the first oblique side surface is an inner radial surface of the pad body portion, the second oblique side surface is an outer radial surface of the coupling piston disk, and the contact between the first oblique side surface and the second oblique side surface moves the plurality of sliding pads radially outward as the coupling piston disk moves from the decoupled axial position to the coupled axial position.

11. A method for coupling an engine of an aircraft propulsion system with a propulsor, the propulsor driven by an output shaft, an engine drive gear driven by the engine decoupled from the output shaft by a clutch assembly in a disengaged state, the method comprising:

driving rotation of the propulsor about a rotational axis with an electric machine coupled with the propulsor by the output shaft;

coupling the engine with the propulsor by axially moving a coupling piston disk mounted about the output shaft from a decoupled axial position to a coupled axial position, the coupling piston disk in the coupled axial position contacting a plurality of sliding pads having obliquely oriented pad body surfaces and radially compressing the sliding pads against a clutching surface on the engine drive gear to couple the engine drive gear with the output shaft; and driving rotation of the propulsor about the rotational axis with the engine.

12. The method of claim 11, wherein each of the plurality of sliding pads includes a pad body portion extending through an aperture in a housing disk fixedly mounted on the output shaft.

13. The method of claim 11, wherein coupling the engine with the propulsor includes relighting the engine.

14. The method of claim 11, further comprising deenergizing the electric machine subsequent to coupling the engine with the propulsor.

15. An aircraft propulsion system comprising:

an engine;

an electric machine; and a gearbox including an output shaft, an electric machine drive gear, an engine drive gear, and a clutch assembly, the output shaft having a rotational axis, the electric machine drive gear mounted on the output shaft, the electric machine drive gear driven by the electric machine, the engine drive gear selectively couplable with the output shaft by the clutch assembly, the clutch assembly including a bearing, a coupling piston disk, and a plurality of sliding pads, the bearing disposed between the output shaft and the engine drive gear, the engine drive gear rotatable relative to the output shaft on the bearing, the clutch assembly selectively coupling the engine drive gear with the output shaft, the clutch assembly configurable in a disengaged state and an engaged state, the engine and the engine drive gear decoupled from the output shaft in the disengaged state of the clutch assembly, the engine and the engine drive gear coupled with the output shaft in the engaged state of the clutch assembly by axial movement of the coupling piston disk to radially compress the plurality of sliding pads against a clutching surface on the engine drive gear, and the output shaft structured to drive a propulsor.

16. The aircraft propulsion system of claim 15, wherein each of the plurality of sliding pads includes a first oblique side surface, the coupling piston disk includes a second oblique side surface radially coincident with the first oblique side surface, the coupling piston disk is axially moveable between a decoupled axial position and a coupled axial position, and the coupling piston disk in the coupled axial position has the second oblique side surface contacting the first oblique side surface.

17. The aircraft propulsion system of claim 15, wherein the clutch assembly includes a contact ring fixedly mounted on the engine drive gear, and the contact ring forms the clutching surface.

18. The aircraft propulsion system of claim 15, wherein the clutch assembly includes a housing disk forming a plurality of pad apertures, and each of the plurality of sliding pads includes a pad body portion extending through a respective one of the plurality of pad apertures.

19. The aircraft propulsion system of claim 15, wherein the plurality of sliding pads are circumferentially arranged about the rotational axis and radially moveable between and inner radial position and an outer radial position.

20. The aircraft propulsion system of claim 15, wherein the gearbox includes an input shaft coupled with the engine by a layshaft assembly, and the layshaft assembly drives the engine drive gear.

* * * * *